United States Patent [19]

Murray

[11] Patent Number: 4,965,459

[45] Date of Patent: Oct. 23, 1990

[54] TELEPHONE LINE SECURITY SYSTEM

[76] Inventor: Thorntone E. Murray, 9898 Forum Park Rd., Houston, Tex. 77036

[21] Appl. No.: 125,260

[22] Filed: May 26, 1989

[51] Int. Cl.⁵ ........................ H04M 1/19; H04M 1/66
[52] U.S. Cl. ................................... 379/189; 379/200; 379/445
[58] Field of Search ................ 379/200, 188, 189, 445

[56] References Cited

U.S. PATENT DOCUMENTS

| | | | |
|---|---|---|---|
| 3,920,936 | 11/1975 | Mogtader | 379/131 |
| 4,008,379 | 2/1977 | Watkins | 379/200 |
| 4,096,357 | 6/1978 | Mogtader | 379/200 |
| 4,099,033 | 7/1978 | Murray | 379/188 |
| 4,246,445 | 1/1981 | Hayasaka et al. | 379/200 |
| 4,251,692 | 2/1981 | Waldman | 379/131 |
| 4,297,534 | 10/1981 | Epstein et al. | 379/200 |
| 4,358,640 | 11/1982 | Murray | 379/200 |
| 4,482,787 | 11/1984 | Sagara et al. | 379/200 |
| 4,511,765 | 4/1985 | Kuo | 379/190 |

FOREIGN PATENT DOCUMENTS 2086187  5/1982  United Kingdom ................ 379/200

*Primary Examiner*—Thomas W. Brown

[57] ABSTRACT

A telephone line security system which provides for telephone subscriber designation of secure digit sequences, exception digit sequences, and authorization digit sequences, wherein the user must necessarily assert a subscriber designated authorization digit sequence onto the telephone line in order to place a telephone call to a telephone number containing a secure digit sequence, unless the subscriber has designated an exception digit sequence to the secure digit sequence. The telephone line system is contained within a secure housing and comprises a telephone line interface circuit, a dial tone detection circuit, a digit determination circuit, a secure digit sequence programming circuit, an authorization digit sequence programming circuit, an exception digit sequence programming circuit, a sequence determination circuit, a system reset circuit, a secure digit sequence detection circuit, an authorization digit sequence detection circuit, an exception digit sequence detection circuit, a telephone call authorization circuit, and a power supply circuit. Designation of all digit sequences is by subscriber programmable circuit and maximum control of what telephone calls may be made, and by what user, on the subscriber's telephone line is maintained.

3 Claims, 3 Drawing Sheets

TELEPHONE LINE SECURITY SYSTEM

BACKGROUND OF THE INVENTION

1. Field of the Invention

This invention relates to new and improved telephone line security systems, and more particularly to telphone line security systems that prohibit outgoing telephone calls to telephone numbers containing certain combinations of digits.

2. Description of the Prior Art

It is well known in the art of telephony that restricting the capacity of a telephone instrument to complete telephone calls to telephone numbers having excessive length enhances the security of the telephone lines. Additionally, it is well known in the art of telephony that restricting the capacity of a telephone instrument to complete telephone calls to telephone numbers having specified first digits enhances the security of the telephone line.

Additionally, it is well known in the art of telephony that use of a code access number that aviods activation of the restrictions on the capacity of a telephone instrument to complete telephone calls to telephone numbers having specified first digits enhances the security of the telephone line.

Additionally, it is well known in the art of telephony to place the device that causes activation of the restrictions on the capacity of a telephone instrument to complete telephone calls to telephone numbers having specified first digits either in the telephone instrument or in series connection between the telephone instrument and the telephone switching center.

The patents provided in the prior art statement submitted herewith illustrate the state of the art in telephone line security systems that prohibit outgoing telephone calls to telephone numbers containing prohibited combinations of digits.

SUMMARY OF THE INVENTION

The unauthorized use of private and commercial telephone lines is a continuing and rapidly growing problem. Large sums of money are paid by telephone subscribers for unauthorized telephone calls made on their telephone line. Recently, the problem has been exacerbated by the increase in toll calls which do not require a "1" or a "0" as a first digit of the telephone number and toll calls that have a telephone number which is no more than seven (7) digits in length.

A great deal of flexibility is necessary to provide a telephone line call restriction system which can handle the constantly increasing number of ways that a toll call can be made. A telephone subscriber needs an easy to use and virtually instant way to update the protection of the telephone line.

Accordingly, it is an object of this invention to provide a telephone line security system which has the flexibility necessary to cope with the constantly increasing number of ways that a toll call can be made.

Another object of this invention is to provide a telephone line security system which gives the telephone subscriber an easy to use and virtually instant way to update the protection of the telephone line.

Another object of this invention is to provide a telephone line security system which allows the telephone subscriber to program in secure digit sequences, which if contained in the telephone number being called, prevents that telephone call from being completed.

Another object of this invention is to provide a telephone line security system which allows the telephone subscriber to enter an authorization code at any telephone instrument on the telephone line, which authorization code then allows one and only one telephone call to a telephone number containing a secure digit sequence to be completed from any telephone instrument on that telephone line.

It is a further object of this invention to provide a telephone line security system that allows the telephone subscriber (user) to program in exception digit sequences, such as the 1-800 digit sequence which initiates a toll-free telephone call or the 102880 digit sequence which initiates an AT&T credit card call, to the secure digit sequences.

It is a further object of this invention to provide a telephone line security system that allows authorization codes to be entered or dialed into any telephone instrument on the telephone line on which the telephone line security system is installed without the use of external devices and allows the next and only next telephone call to be made to the limit of the entered authorization code from any telephone instrument on that telephone line.

It is a further object of this invention to provide a telephone line security system that includes a secure housing which is connected directly to the telephone line connection box, is lockable, and does not interfere with the free removability and placement of any telephone instrument connection cables. A still further object of this invention is to provide a telephone line security system which gives the telephone subscriber complete control of the use of the telephone subscriber's telephone line with the maximum ease of installation and use.

Other objects of the invention will become apparent from the specifications and claims as hereinafter related.

The above stated objects and other objects of the invention are accomplished by providing ways for user programmability of secure digit sequences, ways for user programmability of exception digit sequences, circuits for user programmability of telephone call authorization codes, circuits for real time restriction of telephone calls made to telephone numbers containing secure digit sequences, unless an exception digit sequence is present or unless the immediately preceding sequence of digits entered on the telephone line was that of an authorization code, parallel connection of the telephone line security system to the telephone subscriber's telephone line, and placement of the telephone line security system within a secure housing.

DESCRIPTION OF THE PREFERRED EMBODIMENT

Figure 1:
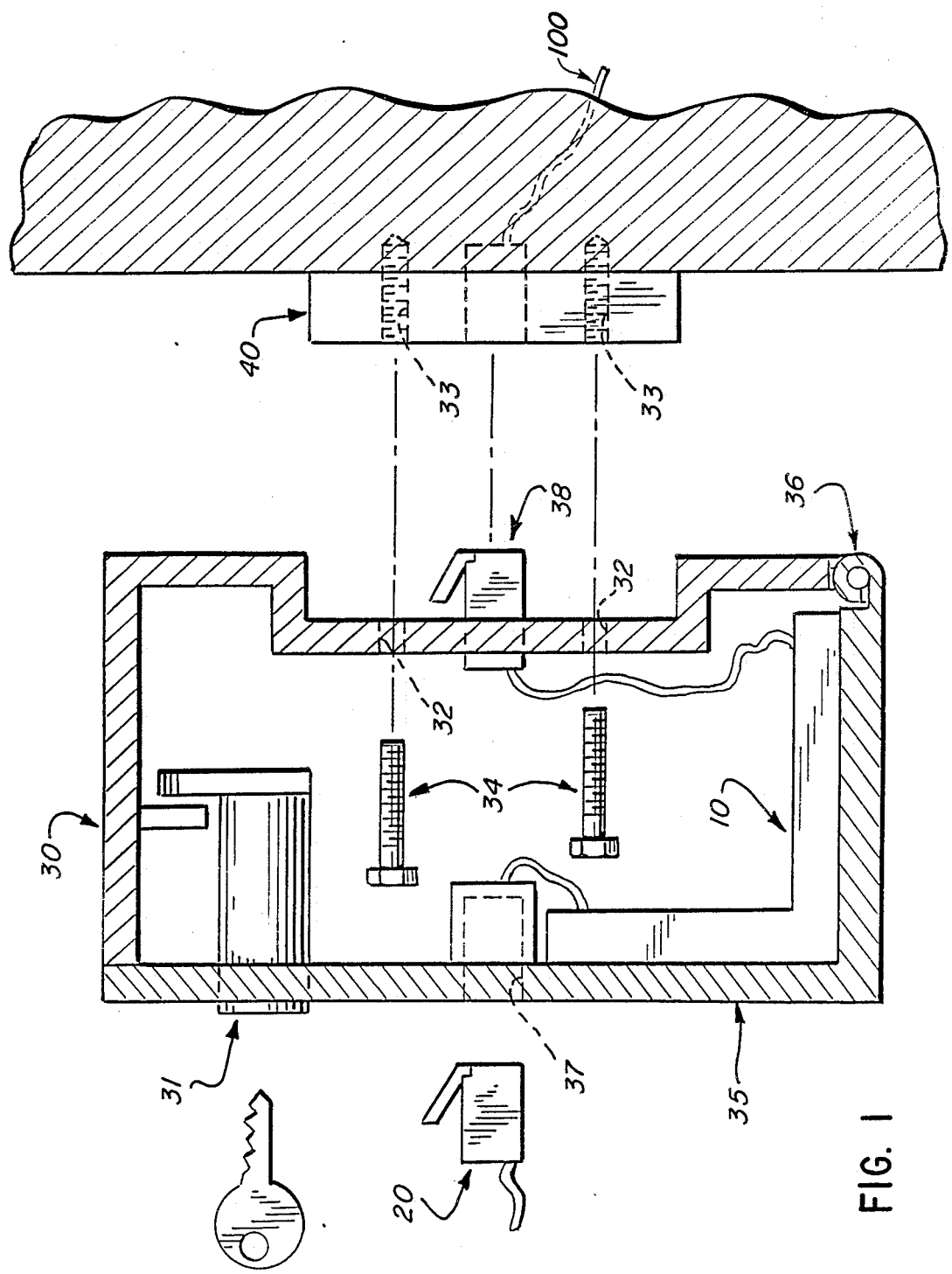
FIG. 1 is a perspective view of the invention contained within the secure housing.

The Telephone Line Security System 10 is shown in FIG. 1 to be contained within a housing 30 which housing 30 is connected to a telephone line connection box 40 at a point along the telephone lines 100 different than the point along the telephone lines 100 at which the telephone instrument connection cable is connected.

Figure 2:
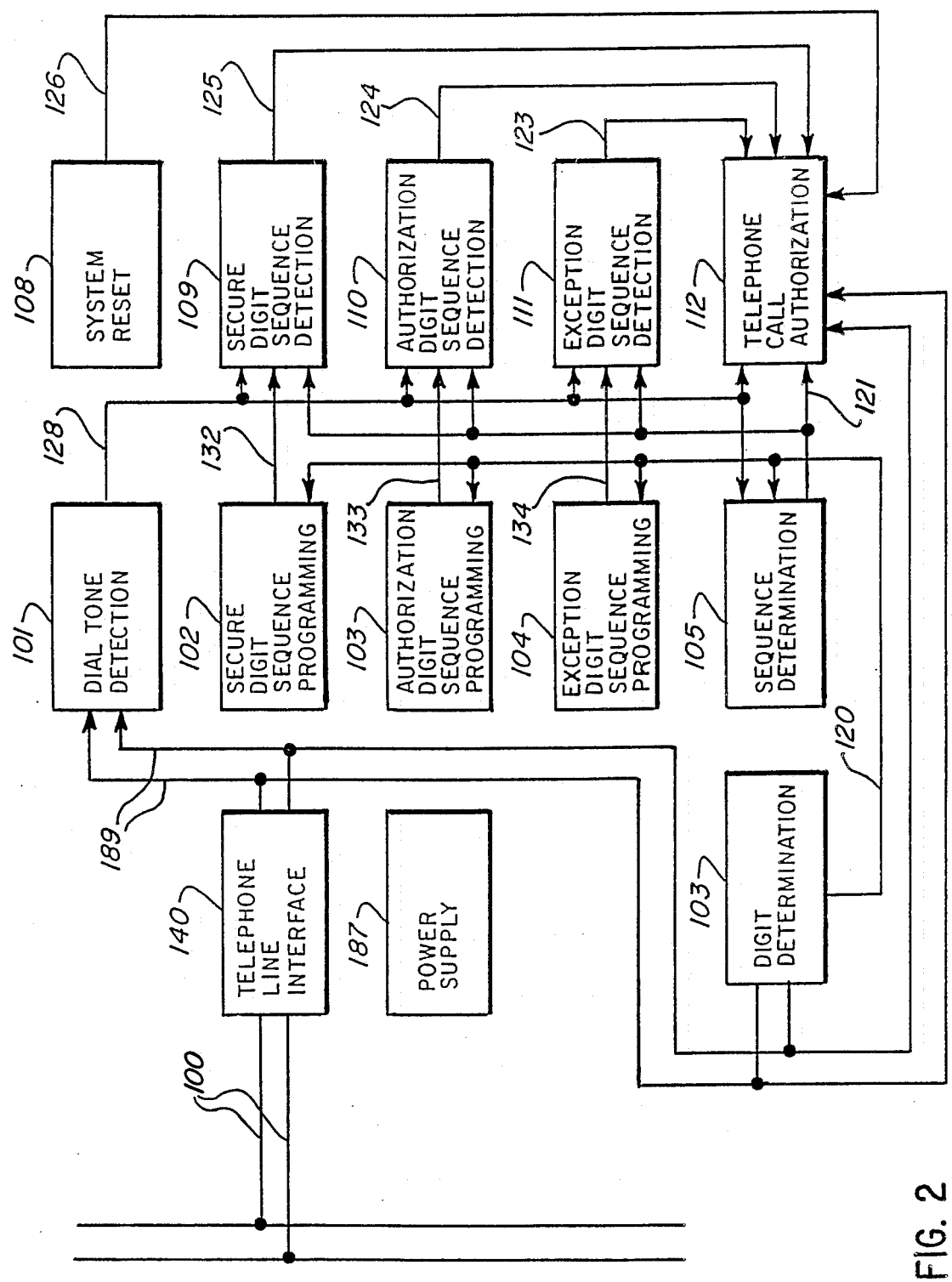
FIG. 2 is a schematic block diagram of the invention.

The Telephone Line Security System 10 is seen in FIG. 2 to comprise a telephone line interface circuit 140, a dial tone detection circuit 101, a digit determination circuit 103, a secure digit sequence programming circuit 104, an authorization digit sequence programming circuit 105, an exception digit sequence programming circuit 106, a sequence determination circuit 107, a system reset circuit 108, a secure digit sequence detection circuit 109, an authorization digit sequence detection circuit 110, an exception digit sequence detection circuit 111, a telephone call authorization circuit 112, and a power supply circuit 187.

As shown in FIG. 2 the electrical connection 188 connects the Telephone Line Security System 10 to the telephone lines 100 by parallel connection. Further, by reference to FIG. 2, it is seen that the electrical connection 188 electrically connects the telephone lines 100 to the telephone line interface circuit 140 within the Telephone Line Security System 10. The telephone line interface circuit is 140 designed and installed in compliance with applicable FCC Rules. Additionally, the telephone line interface circuit 140 is shown in FIG. 2 to be connected by electrical connection 189 to three components within the Telephone Line Security System 10: the digit determination circuit 103, the dial tone detection circuit 101, and the telephone call authorization circuit 112.

Further, FIG. 2 shows the direction of signal flow between and the existence of electrical connection between the previously stated components of the Telephone Line Security System 10. The output of the dial tone detection circuit 101 is shown in FIG. 2 to have electrical connection 128 to the imputs of the sequence determination circuit 107 the secure digit sequence detection circuit 109, the authorization digit sequence detection circuit 110, the exception digit sequence detection circuit 111, and the telephone call authorization circuit 112. The output of the digit determination circuit 103 is shown in FIG. 2 to have electrical connection 120 to the inputs of the secure digit sequence programming circuit 104, the authorization digit sequence programming circuit 105, the exception digit sequence programming ciocuit 106, and the sequence determination circuit 107. The output of the secure digit sequence programming circuit 104 is shown in FIG. 2 to have electrical connection 132 to the input of the secure digit sequence detection circuit 109. The output of the authorization digit sequence programming circuit 105 is shown in FIG. 2 to have electrical connection 133 to the input of the authorization digit sequence detection circuit 110. The output of the exception digit sequence programming circuit 106, is shown in FIG. 2 to have electrical connection 134 to the input of the exception digit sequence detection circuit 111. The output of the sequence determination circuit 107 is shown in FIG. 2 to have electrical connection 121 to the inputs of the secure digit sequence detection circuit 109, the authorization digit sequence detection circuit 110, the exception digit sequence detection circuit 111, and the telephone call authorization circuit 112. The output of the system reset circuit 108 is shown in FIG. 2 to have electrical connection 126 to the input of the telephone call authorization circuit 112. The output of the secure digit sequence detection circuit 109 is shown in FIG. 2 to have electrical connection 125 to the input of the telephone call authorization circuit 112. The output of the authorization digit sequence detection circuit 110 is shown in FIG. 2 to have electrical connection 124 to the input of the telephone call authorization circuit 112. Finally, the output of exception digit sequence detection circuit 111 is shown in FIG. 2 to have electrical connection 123 to the input of the telephone call authorization circuit 112.

The operation of each component comprising the Telephone Line Security System 10 is relatively straightforward and a description of same may be seen to be a description of the whole, as follows:

The system reset circuit 108 generates an output signal only upon initial application of power to the Telephone Line Security System 10. The output signal serves to initialize or reset logic within the telephone call authorization circuit 112.

The dial tone detection circuit 101 generates an output signal only at such time as a dial tone is present on telephone lines 100.

The digit determination circuit 103 provides circuitry for use with both dual tone multi-frequency (DTMF) operated telephone instruments and pulse dial type telephone instruments. Accordingly, the digit determination circuit 103 is capable of generating an output signal if either the pulses present on the telephone lines 100 correspond to a digit or if the combination of tones present on the telephone lines 100 correspond to a digit. A unique output signal is generated by the digit determination circuit 103 for each digit determined to be present on the telephone lines 100. In the preferred embodiment, the unique output signal is accomplished by having a distinct output lead from the digit determination circuit 103 for each digit.

The secure digit sequence programming circuit 104, the authorization digit sequence programming circuit 105, and the exception digit sequence programming circuit 106 each receive input signals from the digit determination circuit 103 via electrical connection 120. As stated earlier, in the preferred electrical connection 120. As stated earlier, in the preferred embodiment, electrical connection 120 comprises a distinct lead to represent each possible digit detected by the digit determination circuit 103. The function of each of the programming circuits, the secure digit sequence programming circuit 104, the authorization digit sequence programming circuit 105, and the exception digit sequence programming circuit 106, is to provide the subscriber with a way of selecting or programming the sequence in which the outputs on the various distinct leads comprising electrical connection 120 will be electrically connected to the inputs of the secure digit sequence detection circuit 109 via electrical connection 132, of the authorization digit sequence detection circuit 110 via electrical connection 133, and of the exception digit sequence detection circuit 111 via electrical connection 134.

The secure digit sequence programming circuit 104 contains user programmable circuitry, as for example, digit switches, which allow the user to designate which digits, sequence of digits, and combination of digits are to be prohibited. Selected secure digit sequence, might for example, be all digit sequences beginning with "1", "0" and "976". Accordingly, selected secure digit sequences might be all such sequences having specified digit combinations in specified positions within the telephone number called. The circuitry of the secure digit sequence programming circuit 104 must necessarily provide for the storage of the selected secure digit sequences.

The authorization digit sequence programming circuit 103 contains user programmable circuitry, as for example, digit switches, which allow the user to designate which sequences of digits are to be the code sequence of digits which, if asserted on the telephone lines 100, will cause the next secure digit sequence encountered following the presence of an output from the dial tone detection circuit 101 to be allowed onto the telephone lines 100 without interference, provided that the code sequence of digits corresponds to that particular secure digit sequence. The correspondence of a code sequence of digits to a particular secure digit sequence is explained later herein in the description of the operation of the telephone call authorization circuit 112. The circuitry of the authorization digit sequence programming circuit 105 must necessarily provide for the storage of the selected code sequence of digits. In the authorization digit sequence programming circuit 105, digits are programmed according to sequence, digit, and in cases where more than one code sequence of digits will be utilized, to a particular code.

The exception digit sequence programming circuit 106, contains user programmable circuitry, as for example, digit switches, which allow the user to designate which digits, sequence of digits, and combination of digits are to be excepted from the secure digit sequence. Selected digit sequences might for example be all sequences of digits beginning with "1 800", or the emergency telephone number sequence of digits "911". The circuitry of the exception digit sequence programming circuit 106 must necessarily provide for the storage of the selected exception digit sequences.

The sequence determination circuit 107 contains circuitry which provides for the counting of the number of input signals, each representing a digit, received from the digit determination circuit 103 via electrical connection 120. The sequence determination circuit 107 generates an output signal on one of a number of leads which are each a part of the electrical connection 121. The number of the leads is coincident with the number of digits in the longest sequence of digits which may be handled by the Telephone Line Security System 10. An output signal is generated on a distinct lead within electrical connection 121 by the sequence determination circuit 107 for each sequential input signal from the digit determination circuit 103 indicating that a digit has been detected on the telephone lines 100. The sequence determination circuit 107 is reset to a zero count, no output on any of the leads, upon the receipt of an input signal from the dial tone detection circuit 101 via the electrical connection 128.

The secure digit sequence detection circuit 109 contains a latch circuit for each digit which may be programmed in the secure digit sequence programming circuit 104. All of the latch circuits are initialized such that the output of the latch circuits are at a false logic level voltage (in a false condition) by the receipt of the input signal to the secure digit sequence detection circuit 109 from the dial tone detection circuit 101 via electrical connection 128. After initialization, the latch circuits are enabled sequentially by an input signal to the secure digit sequence detection circuit 109 from the sequence determination circuit 107 via electrical connection 121. When one of the enabled latch circuits receives an input signal from the secure digit sequence programming circuit 104, the output of the latch circuit is latched to a true logic level voltage. All of the outputs from the latch circuits associated with a particular secure digit sequence are input to an AND gate circuit. The output of the AND gate will be a true logic level 10 voltage when all of the inputs to the AND gate are true logic level voltages. The output signals of the AND gates representing various secure digit sequences is the output signal of the secure digit sequence detector 109 and occurs only when a secure digit sequence has been asserted onto the telephone lines 100.

The authorization digit sequence detection circuit 110 contains a latch circuit for each digit which may be programmed in the authorization digit sequence programming circuit 105. All of the latch circuits are initialized such that the output of each of the latches are at a false logic level voltage (in a false condition) by the receipt of the input signal to the authorization digit sequence detection circuit 110 from the dial tone detection circuit 101 via electrical connection 128. After initialization, the latch circuits are enabled sequentially by an input signal from the sequence determination circuit 107. When one of the enabled latch circuits receives an input signal from the authorization digit sequence programming circuit 105, the output of the latch circuit is latched to a true logic level voltage. All of the outputs from the latch circuits associated with a particular authorization digit sequence are input to an AND gate circuit. The output of the AND gate will be a true logic level voltage when all of the inputs to the AND gate are true logic level voltages. The output signals of the AND gates representing various authorization digit sequences is the output signal of the authorization digit sequence detector 110 and occurs only when an authorization digit sequence has been asserted onto the telephone lines 100.

The exception digit sequence detection circuit 111 contains a latch circuit for each digit which may be programmed in the exception digit sequence programming circuit 106. All of the latch circuits, unlike the latch circuits in the secure digit sequence detection circuit 109 and in the authorization digit sequence detection circuit 110, are initialized such that the output of each of the latch circuits within the exception digit sequence detection circuit is a true logic level voltage (initialized to a true condition) by the receipt of an input signal to the exception digit sequence detection circuit 111 from the dial tone detection circuit 101 via electrical connection 128. The toggle input to each of the latch circuits within the exception digit sequence detection circuit 111 is electrically connected to one and only one of the output leads of the sequence determination circuit 107. The toggle input to each of the latch circuits, for a given exception digit sequence, is present only when an output signal from the sequence determination circuit 107 is present on the particular sequence determination circuit 107 output lead which is electrically connected to the toggle input of the latch circuit. Each of the latch circuits may also receive a disabling input signal from the exception digit sequence programming circuit 106 via electrical connection 134. When one of the latch circuits receives an input signal from the exception digit sequence programming circuit 106 the latch circuit is disabled, that is, the latch circuit will not toggle to a false logic level voltage output when a toggle input signal is received from the sequence determination circuit 107. The outputs of the latch circuits associated with a particular exception digit sequence are all input to a single AND gate within the exception digit sequence detection circuit 111. The output of the single AND gate will go to a false logic level voltage output with any false logic level voltage input to the single AND gate. The outputs of all of the exception digit sequence AND gates are then input to a final AND gate within the exception digit sequence detection circuit 111. The output of the final AND gate, the exception signal, is the output of the exception digit sequence detection circuit 111. The exception signal will go to a false logic level voltage output when any of the latches contained within the exception digit sequence detection circuit 111 is not disabled by an output from the exception digit programming circuit 106 via electrical connection 134 upon receipt of a toggle input from the sequence determination circuit 107 via electrical connection 121.

The power supply circuit 187 provides the voltages and currents necessary to the operation of all other parts of the Telephone Line Security System 10.

Figure 3:
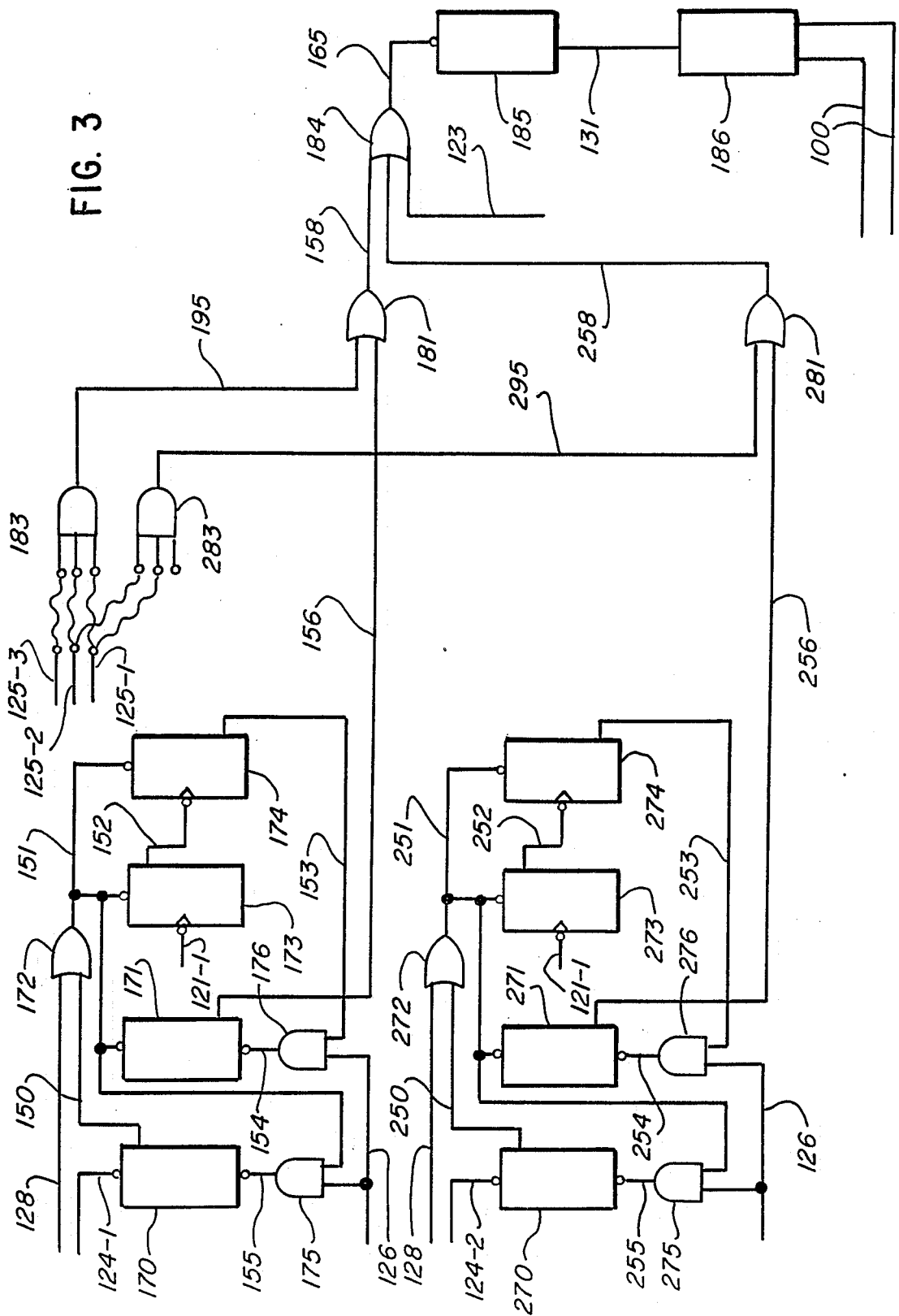
FIG. 3 is a logic diagram of the telephone call authorization circuits of the preferred embodiment of the invention.

FIG. 3 is the logic diagram of the telephone call authorization circuit 112. Note that one of the inputs to OR gate 184 is the electrical connection 123 to the output of the exception digit sequence detection circuit 111 which is high true, i.e. uses positive logic wherein the true logic level voltage is more positive than the false logic level voltage. If the output voltage of the exception digit sequence detection circuit 111, as measured at electrical connection 123, is high, the output voltage of the OR gate 184 will be forced high regardless of any of the other input voltages to the OR gate 184. The output of OR gate 184 has electrical connection 165 to the input of the timer 185. The timer 185 generates an output signal only upon receipt of a low voltage pulse or signal from the OR gate 184. The timer 185 output signal enables the signal generator 186. The signal generator 186 output has electrical connection to the telephone lines 100. When the signal generator 186 is enabled, its output signal is asserted onto the telephone lines 100 as an electrical signal of audible frequency having sufficient amplitude to be heard by the telephone instrument user, even if the telephone instrument receiver is not close to the user's ear, thus making communication impossible.

Also shown in FIG. 3 are three inputs (125-1, 125-2, and 125-3) from the secure digit sequence detection circuit 109 and two inputs (CODE A on electrical connection 124-1 and CODE B on electrical connection 124-2) from the authorization digit sequence detection circuit 110 to the telephone call authorization circuit 112. The electrical connections 124-1, 124-2, and 124-3 may be subscriber programmable and provide circuits to determine which authorization code will authorize which secure digit sequence. However, any number of imputs from either the secure digit sequence detection circuit 109 or the authorization digit sequence detection circuit 110 can be accommodated via expansion of associated circuitry within the telephone call authorization circuit 112.

The following description will be limited to one of the pair of identical circuits, one circuit for CODE A and one circuit for CODE B, contained within the FIG. 3 logic diagram of the telephone call authorization circuit 112 for brevity, but operation of both circuits will be clear.

The power on reset signal from the system reset circuit 108, a negative going pulse which is activated when power is first applied to the Telephone Line Security System 10, is applied to the inputs of AND gates 175 and 176 via electrical connection 126 forcing the outputs of AND gates 175 and 176 to a low voltage, or low state, for at least the duration of the power on reset signal from the system reset circuit 108. The negative going output voltages from AND gates 175 and 176 are applied to the inputs of latches 170 and 171 electrical connections 155 and 154, respectively. The output used from latch 170 is forced to a high voltage, or high state, and the output from latch 171 is forced to a low state. The low state output from latch 171 is connected to the input of OR gate 181 via the electrical connection 156 and acts to enable OR gate 181. When the authorization code programmed into the authorized digit sequence programming circuit 105 is detected by the authorized digit sequence detection circuit 110, CODE A 124-1 goes to a low state. The output of the authorized digit sequence detection circuit 110 is applied to the input of latch 170 via the electrical connection 124-1, and acts to make the output of latch 170 go to a low state. The low state output of latch 170 is input to OR gate 172 via electrical connection 150. The low state output of latch 170 causes OR gate 172 to be enabled.

The presence of a dial tone on the telephone lines 100 causes the output of the dial tone detection circuit 101 to go to a low state for the duration of the dial tone. The low state at the output of the dial tone detection circuit 101 is applied to the input of OR gate 172 via electrical connection 128 and causes the output of OR gate 172 to go to a low state for the duration of the dial tone. The low state output of OR gate 172 is input to AND gate 175 via electrical connection 151. AND gate 175 is enabled by the high state output of the system reset circuit 108 as measured on electrical connection 126 due to the absence of the power on reset signal. The low state output of OR gate 172 is applied to the inputs of latch 171 and AND gate 175 via electrical connection 151. The low state input to AND gate 175 causes the output of AND gate 175 to go to a low state. The low state output of AND gate 175 is input to latch 170, via electrical connection 155, in such manner as to cause the output of latch 170 to latch to a high state. The high state output of latch 170 disables OR gate 172 and prevents subsequent input signals from the dial tone detection circuit 101 from affecting latch 171 and flip flops 173 and 174. The low state of the output of OR gate 172 is also routed, via electrical connection 151, to the input of latch 171 causing its used output to latch to a high state. The high state of the output of latch 171 is routed, via electrical connection 156, to the input to OR gate 181, disabling OR gate 181. When OR gate 181 is disabled, the detection of a true output from the secure digit sequence circuit 109 is effectively blocked from the input of OR gate 184 and thus from the timer 185 which, as will be described in greater detail later, prevents communications between a telephone instrument connected to telephone lines 100 and a telephone number comprising a secure digit sequence. The low state output of OR gate 172 is additionally applied to the inputs of flip flops 173 and 174, via electrical connection 151, causing the outputs of flip flops 173 and 174 to go to low and high states respectively. Flip flops 173 and 174 are of a type which will toggle the outputs upon receipts of a negative going state transition at the clock input. As described previously, the output of the sequence determination circuit 107 provides an output on electrical connection 121-1 which will pulse low at the time that the first digit is asserted onto the telephone lines 100 following the receipt of a dial tone. When the first digit is asserted, (after the assertion of an authorization digit sequence and subsequent dial tone) the used output of flip flop 173 will toggle to a high state. When the next first digit is asserted, (after the assertion of an authorization digit sequence, subsequent dial tone used to make authorized call, and next following dial tone) the used output of flip flop 173 will toggle to a low state causing the used output of flip flop 174 to also toggle to a low state. The low state from flip flop 174 is input, via electrical connection 153, to AND gate 176 which is enabled in similar fashion, as was described for AND gate 175. The resulting low state at the output of AND gate 176 is applied to latch 171 in such manner as to latch the used output of latch 171 to a low level. The low level output of latch 171 is input, via electrical connection 156, to OR gate 181 enabling OR gate 181 and effectively removing the block that disallowed detection of a secure digit sequence by OR gate 184 and timer 185.

When a sequence of digits which meets the parameters programmed into the exception digit sequence programming circuit 106 is encountered, the output of the exception digit sequence detection circuit 111 which is measured on electrical connection 123 will be at a high state disabling OR gate 184 thus preventing timer 185 from being triggered.

The timer 185 is of an adjustable type that is set in the preferred embodiment for approximately 20 seconds. The output of the timer 185 is input, via electrical connection 131, to signal generator 186 as an enable pulse. During the period of time that the timer 185 is set for, the timer 185 output will enable the signal generator 186. The signal generator 186 will introduce a signal onto the telephone lines 100 of sufficient amplitude to be heard clearly even if the telephone instrument receiver is not held close to the user's ear, but not of high enough amplitude to cause discomfort if the receiver is held in a normal position next to the ear.

AND gates 283 and 183 are secure digit sequence discriminators. That is, outputs from the secure digit sequence detection circuit 109 that will be authorized, for example, by CODE A will go to AND gate 183 whose output is directed to the portion of the telephone call authorization circuit 112 logic that CODE A goes to. In this manner telephone calls to numbers containing secure digit sequences but which are authorized by code A are allowed to be completed.

The output of AND gate 183 is input, via electrical connection 195, to OR gate 181 which is the final logic gate exclusive to that portion of the telephone call authorization circuit 112 which to CODE A is input via electrical connection 124-1. The inputs to AND gate 183 are the outputs of the secure digit sequence detection circuit 109 which have been chosen by the subscriber to be authorized by CODE A. The signal as measured at electrical connection 156 will be at a high state during the dialing sequence that was authorized by CODE A, disabling OR gate 181. Therefore, the signal as measured at electrical connection 195, being at a low true logic state, i.e. using negative logic wherein the true logic level voltage is less positive than the false logic level voltage, due to one or more of the inputs to AND gate 183 being at a low true logic state, will not trigger timer 185. However, if the secure digit sequence dialed was chosen by the subscriber to authorized by CODE B, the output of AND gate 283 would go to a low true logic state. Since the sequence of digits comprising CODE B was not entered, OR gate 281 will not be disabled and the low true logic level voltage output of AND gate 283, which is input to OR gate 281 via electrical connection 295, will cause the output of OR gate 281 to go to a low true logic level voltage. The output of the OR gate 281 is input, via electrical connection 258, to the input to the OR gate 184. If the OR gate 184 is not disabled due to receipt of a CODE A, then the output of the OR gate 184 will got to a low tue logic level voltage upon input of a low true logic level voltage from the OR gate 281. When the output of the OR gate 184 goes to a low true logic level voltage, that output, which is input to the timer 2185 via electrical connection 165, triggers the timer 185. The output of the timer 185 is input, via electrical connection 131, to the signal generator 186. When the signal generator 186 receives an input from the timer 185, the signal generator is enabled.

Returning now to FIG. 2, it is seen that the output of the exception digit sequence detection circuit 111 must be a high true logic level voltage in order to disable the OR gate 184 which controls the output from the telephone call authorization circuit 112 to the telephone lines 100. Further, the exception digit sequence programming circuit 106 is programmed to allow certain telephone numbers to be completed even though these telephone numbers contain digit sequences which are programmed to be controlled via authorization codes. The Telephone Line Security System 10, however, cannot output any disabling frequencies if the number being dialed is programmed as an exception. This is why the output of the exception digit sequence detection circuit 111 must remain at a high true logic level voltage until a digit not in the exception digit sequence programmed into the exception digit sequence programming circuit 106 is asserted onto the telephone lines 100.

As shown in FIG. 1, the housing 30 of the Telephone Line Security System 10 is constructed having one access door 35 which has a lock 31 and a hinge 36. The access door 35 to the housing 30 must be unlocked and open to facilitate programming and the removal of the Telephone Line Security System 10 from the telephone lines 100 without extensive damage to the telephone line connection box and to the Telephone Line Security System 10 itself.

Installation of the Telephone Line Security System 10 is accomplished as follows. The housing 30 provides screw holes 32 in the back of the housing 30 which align with the existing screw holes 33 in the telephone line connection box 40. Existing screws 34 are removed from the telephone line connection box 40, the housing 30 is mounted, then the screws 34 are reinserted through the aligned screw holes 32 and 33 at the rear of the housing 30 securing the housing 30 to the telephone line connection box 40. When the access door 35 of the housing 30 is closed and locked the screws 34 are inaccessible.

The housing 30 provides a modular jack 37 to allow a telephone instrument connection cable 20 to be connected to and disconnected from the Telephone Line Security System 10 while the access door 35 of the housung 30 is secured.

I claim:

1. A telephone line security system which controls the telephone numbers which may be called on a telephone line, comprising:
   a telephone line interface circuit which is connected to the telephone line and provides electrical isolation between the telephone line and the telephone line security system;

a dial tone detection circuit which is connected to the telephone line interface circuit that provides an output signal when a dial tone is detected on the telephone line;

a digit determination circuit which is connected to the telephone line interface circuit and provides an output unique to each digit of a telephone number asserted onto the telephone line;

a secure digit sequence programming circuit which is subscriber programmable and stores each sequence of digits occurring in telephone numbers which are to be prohibited;

an authorization digit sequence programming circuit which is subscriber programmable and stores each sequence of digits which are selected to be code number sequences;

an exception digit sequence programming circuit which is subscriber programmable and stores each sequence of digits which occur in telephone numbers which are selected to be exceptions to the sequences of digits occurring in telephone numbers which are to be prohibited;

a sequence determination circuit which produces an output upon receipt of each input from the digit determination circuit, which output indicates the number of the input within a sequence of the inputs;

a system reset circuit which produces an output that resets a telephone call authorization circuit upon initial application of power to the telephone line security system;

a secure digit sequence detection circuit which produces an output if the sequence of digits input from the digit determination circuit coincides with a sequence of digits stored in the secure digit sequence programming circuit;

an authorization digit sequence detection circuit which produces an output if the sequence of digits input from the digit determination circuit coincides with a sequence of digits stored in the authorization digit sequence programming circuit;

an exception digit sequence detection circuit which produces an output if the sequence of digits input from the digit determination circuit coincides with a sequence of digits stored in the exception digit sequence programming circuit;

said telephone call authorization circuit is connected to the telephone line interface circuit and asserts an output onto the telephone line which makes communication impossible if the secure digit sequence determination circuit has an output, if the exception digit sequence determination circuit does not have an output, and the telephone call placed immediately prior was not of a sequence of digits which caused the authorization digit sequence determination circuit to produce an output.

2. The telephone line security system as described in claim 1 further comprising a power supply circuit which supplies all necessary voltages and currents for the operation of the telephone line security system.

3. The telephone line security system as described in claim 1 further comprising a housing which is attached to a telephone line connection box, provides a lockable, hinged door on a side of the housing, provides a connector for connection to the telephone line on the side of the housing connected to the telephone line connection box, and provides a connector for connection of a telephone cable on a side of the housing other than the side of the housing which is connected to the telephone line connection box.

* * * * *